R. RONDEAU.
PNEUMATIC TIRE.
APPLICATION FILED FEB. 7, 1911.

1,079,515.

Patented Nov. 25, 1913.

Witnesses:
E. E. Warfield
R. C. Fitzhugh

Inventor:
René Rondeau
by
Mauro, Cameron, Lewis & Massie
Attys.

UNITED STATES PATENT OFFICE.

RENÉ RONDEAU, OF PARIS, FRANCE, ASSIGNOR TO SOCIÉTÉ FERMIÈRE DE L'AUTOMATIQUE DUCASBLE, OF PARIS, FRANCE.

PNEUMATIC TIRE.

1,079,515.   Specification of Letters Patent.   Patented Nov. 25, 1913.

Application filed February 7, 1911. Serial No. 607,168.

*To all whom it may concern:*

Be it known that I, RENÉ RONDEAU, a citizen of the Republic of France, residing in Paris, France, (whose post-office address is 61 Rue Boursault, Paris, France,) have invented a new and useful Improvement in Pneumatic Tires, which improvement is fully set forth in the following specification.

This invention relates particularly to improvements upon pneumatic tires of the type illustrated in French patent to Ducasble No. 7,099 of March 12, 1907, second addition to French Patent No. 326,018, in which type of tire an annulus of indiarubber is provided internally with hollow chambers or cells in free communication with the atmosphere presenting the advantage, as compared with ordinary pneumatic tires, of not puncturing or bursting. Nevertheless, this form of tire presented certain inconveniences which have prevented its wide adoption for automobile purposes. Firstly, the thickness of indiarubber surrounding the inner chambers or cells was not uniform, presenting a maximum thickness in the longitudinal axis of the tire and a minimum thickness transversely of said axis. In particular it might be considered that the original form of the tire was constituted in horizontal section by circular thicknesses of indiarubber, the outer part of which was sectioned laterally and tangentially to the point of connection of the several elements, one with the other. This tire, therefore, presented a greater thickness in the plane of the tread at points between the cells or chambers, or in other words hard and less pliable points than the parts located beneath the cells. Then again at these points the tire was much weakened laterally by the deep lateral recesses, the most hollowed portions of which were situated beneath the center of the chambers so that the tire was also weakened toward its tread circle which rendered it very readily deformable transversely. The result of this peculiarity in its conformation was that the tire while presenting a series of hard points on its periphery yielded at high speeds and oscillated around its vertical position in becoming inclined which produced a slight rolling of the rear wheels such as takes place when ordinary compressed air pneumatic tires are somewhat deflated.

The improved pneumatic tire which forms the object of this invention obviates this defect owing to the fact that the material is distributed in an absolutely uniform and rational manner relatively to the inner chambers or cells and to the lateral recesses.

Figure 1:
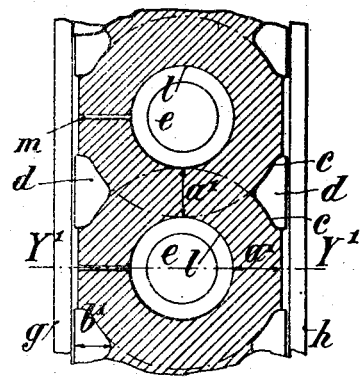
Figure 2:
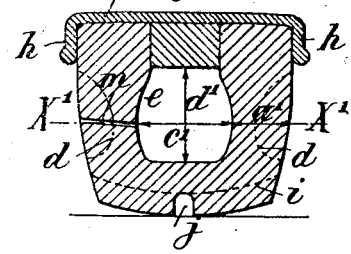
Figure 3:
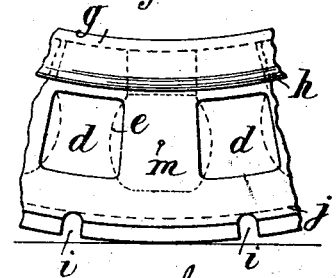

The novel pneumatic tire is represented in Figure 1 in section on the line X' X' Fig. 2; Fig. 2 in vertical section on the line Y' Y' in Fig. 1; and in Fig. 3 in partial side elevation.

As shown in these figures the thickness of indiarubber surrounding the cells is absolutely uniform because in the section X' X', Fig. 1, the thickness $a'$ is constant both laterally and between two consecutive cells and in the vertical section Y' Y' in such a manner that the tire can no longer be considered as constituted of separate elements connected up one with the other but as an absolutely homogeneous whole. With this object the cells $e$ have been suitably brought together in such a manner that the outer circles $c\ c$ instead of being tangential one to the other are tangential to the inner circles $l$. The transverse dimensions $c'$ of the chamber and its height $d'$ are also selected in such a manner that the thickness $a'$ is approximately constant and the lateral recesses $d$ are raised relatively to the tread surface in such a manner that they are at the same height as the cells $e$ and their most hollowed portion approximately coincides in height with the center of the cells $e$. In addition their depth $b'$ is calculated in such a manner as to maintain the thickness $a'$ constant in the plane of the horizontal section passing through the widest part of the cell. The tire is thus divided in the direction of its height into three zones each serving an absolutely distinct purpose. (1) A tread band comprises between the ground and the lower part of the cells and on the outer recesses which transmits to the flexible zone the powerful shocks that it has been unable to absorb. (2) The zone of flexibility comprising the whole of the effective height of the cells and of the lateral recesses which absorbs all the important shocks owing to its ready deformation in the vertical direction and to the operation of the free air cells. (3) The base of the tire serving to support it upon the rim and fix it thereto. Finally, the form of the tire in section is that of a trapesium with slightly curved or rectilinear sides, the largest base being embedded in a metal rim $g$ with flat lateral flanges $h$ rising sufficiently to embrace the base of the tire and prevent it from oscillating without weakening this base in any way.

It will, of course, be understood that the lateral form of the recesses may vary provided that the conditions set forth above are met and the chambers $e$ are not only able to communicate freely with the air through the passages $m$ but also one with the other indiscriminately or in groups. The tread surface may also be provided with transverse channels $i$ and with one or more longitudinal channels $j$ or with metal rivets in order to provide a non-skid surface.

What is claimed is:—

A wheel tire consisting of an annular body of rubber having in its interior a succession of chambers or cells in communication with the atmosphere and at its exterior in each of its side walls a succession of recesses, the interior chambers and the exterior recesses being of such shape and relative location that if an annular section is made of the tire in the portion of the chamber of greatest section the thickness of the rubber is uniform both on the sides of the tire and between the succeeding cells or chambers and that in the case of a cross section through the cells the thickness of the rubber wall about the cell is substantially constant.

In witness whereof I have hereunto set my hand in presence of two witnesses.

RENÉ RONDEAU.

Witnesses:
    DEAN B. MASON,
    ALBERT BERG